(12) United States Patent
Silver

(10) Patent No.: US 11,212,643 B1
(45) Date of Patent: *Dec. 28, 2021

(54) RELATIVE DEVICE LOCALIZATION

(71) Applicant: CSC Holdings, LLC, Bethpage, NY (US)

(72) Inventor: Kenneth Silver, Plainview, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,994

(22) Filed: Nov. 8, 2019

Related U.S. Application Data

(63) Continuation of application No. 15/156,911, filed on May 17, 2016, now Pat. No. 10,477,344.

(51) Int. Cl.
| | |
|---|---|
| *H04W 4/23* | (2018.01) |
| *H04W 4/02* | (2018.01) |
| *H04L 12/26* | (2006.01) |
| *H04W 24/08* | (2009.01) |

(52) U.S. Cl.
CPC ......... *H04W 4/023* (2013.01); *H04L 43/0852* (2013.01); *H04W 24/08* (2013.01)

(58) Field of Classification Search
CPC .......... G06F 17/30241; G06F 17/3087; G06Q 20/32; H04M 15/00; H04M 17/20
See application file for complete search history.

(56) References Cited

U.S. PATENT DOCUMENTS

| | | |
|---|---|---|
| 6,888,532 B2 | 5/2005 | Wong et al. |
| 10,477,344 B1 | 11/2019 | Silver |
| 10,893,381 B2 * | 1/2021 | Kazemi ................... G01S 19/23 |
| 2011/0004893 A1 | 1/2011 | Borislow et al. |
| 2011/0320588 A1 | 12/2011 | Raleigh |
| 2012/0066707 A1 | 3/2012 | Poder et al. |
| 2013/0040655 A1 | 2/2013 | Keidar |
| 2014/0012981 A1 | 1/2014 | Samuell et al. |
| 2014/0039840 A1 | 2/2014 | Yuen et al. |
| 2015/0355336 A1 * | 12/2015 | Krulwich .............. G01S 5/0236 342/357.51 |
| 2018/0180744 A1 | 6/2018 | Lu |

* cited by examiner

*Primary Examiner* — Liton Miah
(74) *Attorney, Agent, or Firm* — Sterne, Kessler, Goldstein & Fox P.L.L.C.

(57) ABSTRACT

Methods and systems to determine a change in a location of a device relative to an initial location of the device are provided. The method includes periodically receiving a parameter of the device and determining the change in the location of the device relative to an initial location of the device based on a change in the parameter over a period of time. In an example, the method includes determining a first trend in the parameter over a first period of time, determining a second trend in the parameter over a second period of time, and determining a change in the location of the device from a first location to a second location by comparing the first trend to the second trend.

20 Claims, 11 Drawing Sheets

RELATIVE DEVICE LOCALIZATION

CROSS-REFERENCE TO RELATED APPLICATIONS

This application is a continuation of U.S. patent application Ser. No. 15/156,911, filed May 17, 2016, now U.S. Pat. No. 10,477,344, which is incorporated herein by reference in its entirety.

BACKGROUND OF THE DISCLOSURE

Field of the Disclosure

The embodiments presented herein generally relate to determining relative location of a device over a period of time.

Background Art

Some media providers do not charge different rates based on a location where the media is viewed. However other media providers have a differential rate structure based on the location where the media is viewed. For example, a media provider might charge a higher rate for media viewed in a commercial establishment when compared to the same media being viewed in a residence. For example, the rate to show media in a commercial establishment might be several times higher than the rate to show the same media in a residence due to licensing and copyright issues.

Media may be delivered wirelessly to a portable media player device that can be coupled to a display device to display the media. In another example, the media player and the display device might be integrated. Since the media player receives the media wirelessly, the media player can be moved from a residential location to a commercial location in order to circumvent the differential rate structure. For example, the differential rate structure might encourage an owner of a commercial establishment, such as a restaurant, to purchase a rate plan for the media player and media delivery service at a residential rate but use the media player to display the media in a commercial establishment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION OF THE DISCLOSURE

Figure 1:
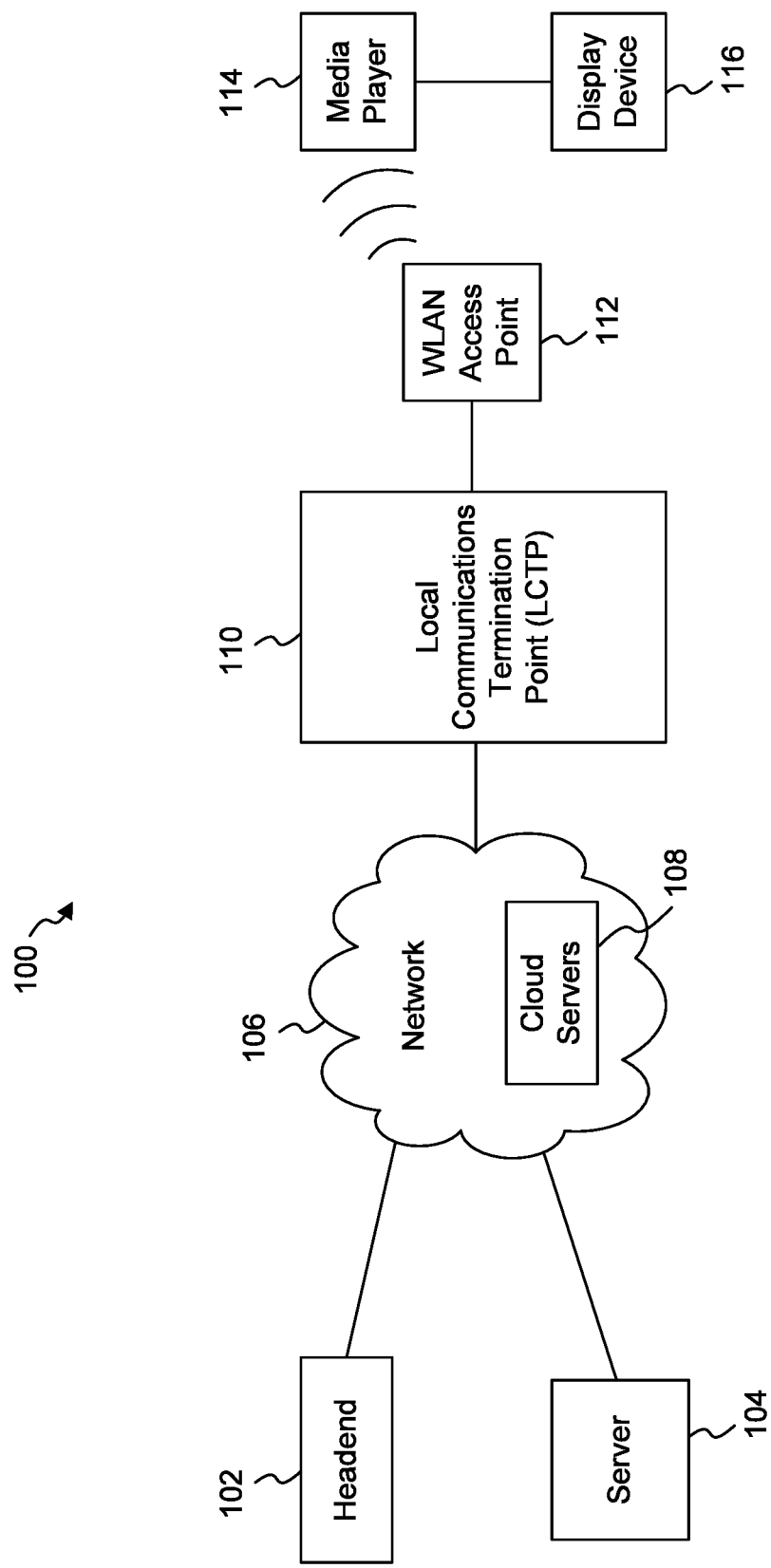
FIG. 1 illustrates an example communication system.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

One or more exemplary embodiments described herein can utilize one or more wireless communication protocols, including for example, WLANs as standardized by the Institute of Electrical and Electronics Engineers (IEEE) in the IEEE 802.11 specification, which is incorporated herein by reference in its entirety. Exemplary embodiments are not limited to wireless communication networks conforming to the 802.11 specification, and can be used or implemented in one or more other kinds of wireless communication access networks, including (but not limited to), Bluetooth (IEEE 802.15.1 and Bluetooth Special Interest Group), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

Further, exemplary embodiments are not limited to the above wireless communication networks and can be used or implemented in one or more wireless communication networks conforming to one or more 3rd Generation Partnership Project (3GPP) wireless communication protocols and/ or to one or more non-3GPP wireless communication protocols. For example, the exemplary embodiments can be configured to utilize one or more cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions or "hardwired" to perform corresponding function(s) according to embodiments described herein. Alternatively, the processor can access an internal and/or external memory to retrieve instructions stored in the memory, which when executed by the processor, perform the corresponding function(s) associated with the processor.

FIG. 1 illustrates an example system 100. System 100 includes a headend 102 and a server 104 coupled to network 106. Network 106 may include cloud servers 108. Network 106 is coupled to a local communications termination point 110. Wireless Local Area Network (WLAN) access point 112 is coupled to local communications termination point 110. Media player 114 is coupled to a display device 116. Media player 114 is in wireless communication with WLAN access point 112.

A WLAN device or WLAN enabled device, such as WLAN access point 112 and media player 114, may be referred to as a "device" or a "Wi-Fi device" herein. Wi-Fi, also spelled "Wife" or "WiFi", is a local area wireless technology that allows an electronic device to exchange data or connect to the Internet using 2.4 GHz ultra high frequency (UHF) and 5 GHz super high frequency (SHF) radio waves. The Wi-Fi Alliance defines Wi-Fi as any "wireless local area network (WLAN) products that are based on the Institute of Electrical and Electronics Engineers' (IEEE) 802.11 standards." Since most WLANs are based on these standards, the term "Wi-Fi" is commonly used as a synonym for "WLAN."

An access point (AP) such as WLAN access point 112 is a device that allows wireless devices to connect to a wired network using Wi-Fi, or related standards. The AP can connect to a router (via a wired network) or a set-top box as a standalone device, but it can also be an integral component of the router or set-top box itself. An AP typically connects directly to a wired Ethernet connection or Data Over Cable Service Interface Specification (DOCSIS) connection. The AP then provides wireless connections using radio frequency links for other devices to utilize the wired Ethernet connection. Most APs support the connection of multiple wireless devices to one wired connection. In the present example, WLAN access point 112 is providing WLAN connectivity to media player 114.

Media player 114 may also be referred to as a WLAN station (STA). In IEEE 802.11 terminology, a station (STA) or WLAN station is a device that has the capability to use the 802.11 protocol for wireless communications. For example, a station may be media player 114, a laptop, a desktop personal computer, a personal digital assistant (PDA), or a WLAN enabled telecommunication device like a smart phone. An STA may be fixed, mobile, or portable. Generally in wireless networking the terms station, wireless client, and node are often used interchangeably. IEEE 802.11 formally defines a station as any device that includes an IEEE 802.11 conformant media access control (MAC) interface and physical layer (PHY) interface to a wireless medium (WM).

Headend 102, media server 104, and/or cloud servers 108 provide media including, but not limited to, video, audio or images over network 106 to local communications termination point 110. In an embodiment, headend 102 includes a DOCSIS headend and local communications termination point 110 includes a set-top box.

Media received by local communications termination point 110 is transmitted to WLAN access point 112 for further transmission to media player 114. Media player 114 is coupled to display device 116. Display device 116 maybe, for example, a television or a portable display device such as a tablet, laptop, or a personal computer. In an embodiment, media player 114 and display device 116 are integrated. For example, media player may be integrated into a television, tablet, or laptop.

Figure 2A:
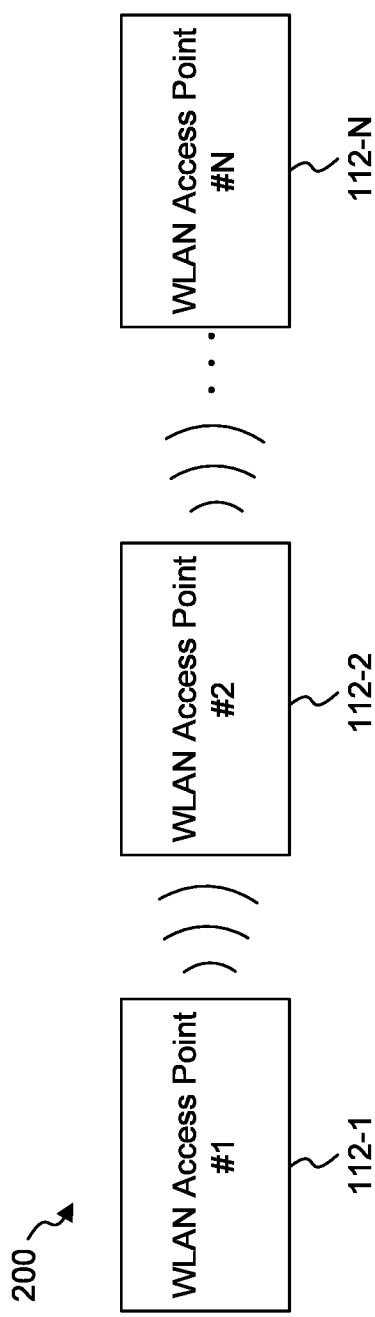
FIG. 2A illustrates an example system to increase the range of a Wireless Local Area Network (WLAN) signal.

FIG. 2A illustrates an example system 200 to increase the range of a WLAN signal. System 200 includes WLAN access points 112-1-N that are in wireless communication with each other. WLAN access point 112-1 generates and transmits a signal that is received by a WLAN access point 112-2. The signal received by WLAN access point 112-2 is amplified and transmitted on to a next WLAN access point and so on up to WLAN access point 112-N. In this manner, the WLAN signal of WLAN access point 112-1 can be extended beyond the range of WLAN access point 112-1 using WLAN access points 112-2-N. A WLAN signal can be extended to any distance by coupling together multiple WLAN access points 112 as would be understood by one of ordinary skill in the art. It is to be appreciated by persons of ordinary skill in the art that N is an arbitrary number and depends on a desired range over which a WLAN signal is to be extended.

Figure 2B:
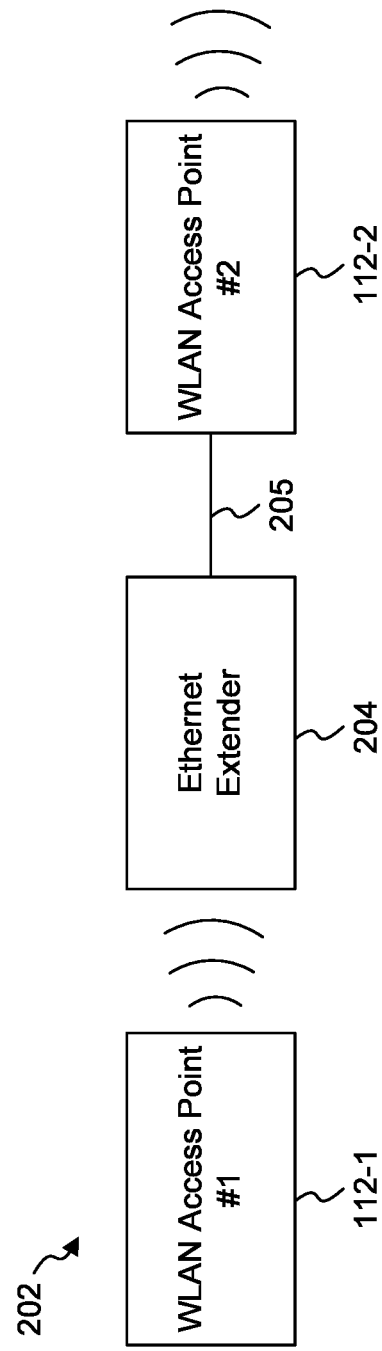
FIG. 2B illustrates another example of a system to increase the range of a WLAN signal.

FIG. 2B illustrates an example system 202 to increase the range of a WLAN signal. In the example in FIG. 2B, WLAN access point 112-1 generates a WLAN signal that is received by an Ethernet extender 204. Ethernet extender 204 is coupled to a WLAN access point 112-2 via a cable 205. Ethernet extender 204 converts the wireless signal received from WLAN access point 112-1 into a signal for transmission onto cable 205. WLAN access point 112-2 receives the signal from Ethernet extender via cable 205 and converts the received signal into a wireless signal for transmission. In this manner, a WLAN signal from WLAN access point 112-1 can be extended beyond the range of WLAN access point 112-1 using Ethernet extender 204 and a WLAN access point 112-2.

Figure 3:
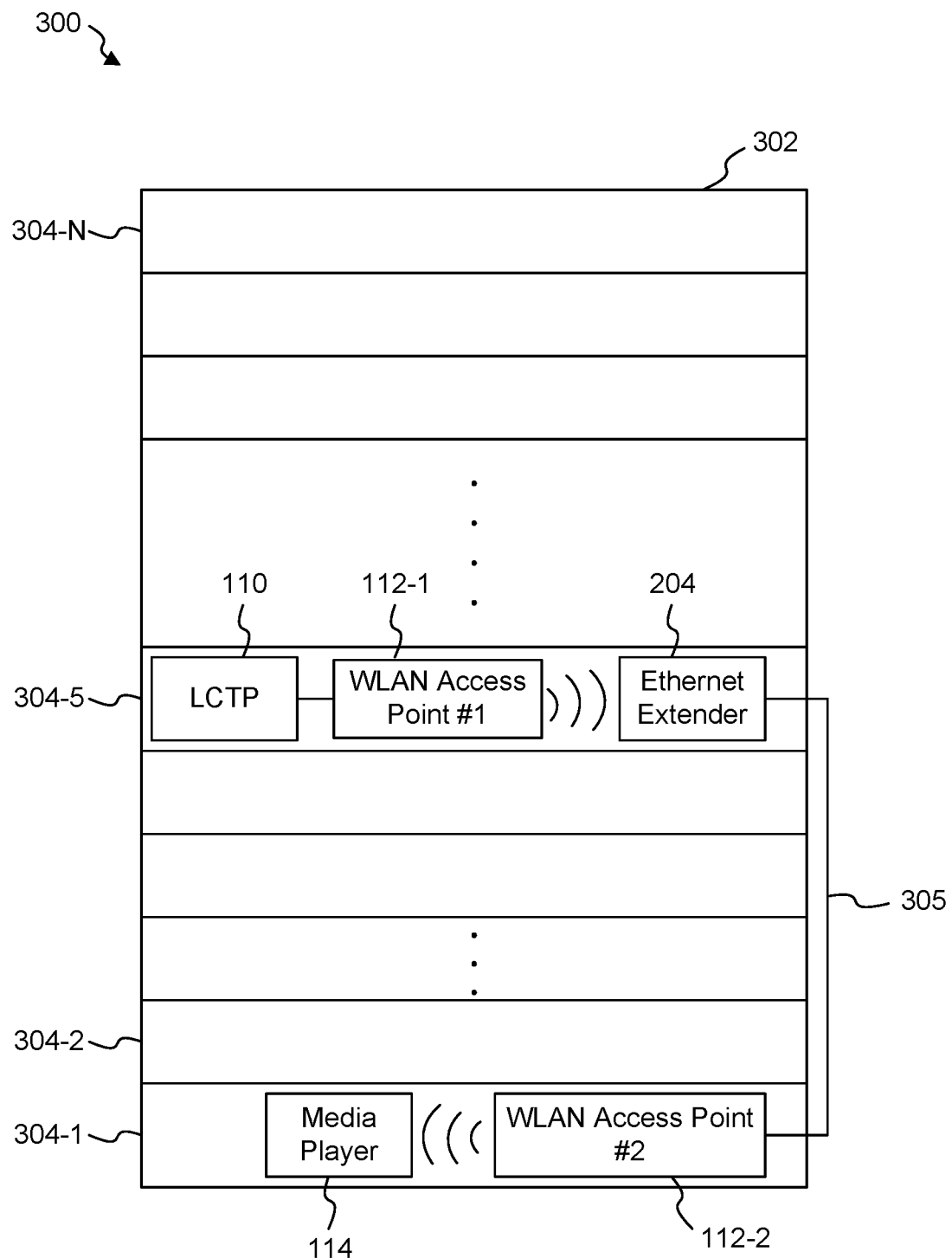
FIG. 3 illustrates an example extension of a WLAN signal.

FIG. 3 illustrates an example system 300 where a WLAN signal is extended. FIG. 3 illustrates a building 302. Building 302 includes floors 304-1-N. In the example in FIG. 3, the first floor 304-1 of building 302 is a commercial lease for a business and the upper floors 304-2-N are residential leases. Local communications termination point 110 and WLAN access point 112-1 are located on the $5^{th}$ floor 304-5. Devices for media playback, such as media player 114, are often leased or rented by a service provider at rates that vary based on where they will be used to display received media. For example, the service provider might charge much higher fees when leasing media player 114 for commercial use, such as in a bar or a restaurant, when compared to a fees charged for residential use such as in a house or apartment. In this example, the charge to use media player 114 to display media is higher for the commercial lease on floor 304-1 and is lower for each of floors 304-2-N.

The differential rate structure creates an incentive for users to lease media player 114 at a residential rate and then extend a received media signal to a commercial location in order to avoid the commercial rate. For example, the owner of the business on floor 304-1 who lives on floor 304-5 might lease media player 114 at a residential rate for use on floor 304-5. The business owner will receive media at local communications termination point 110 which is coupled to WLAN access point 112-1. A wireless signal generated by WLAN access point 112-1 can be extended using Ethernet extender 204. For example, Ethernet extender 204 can be used to run a cable 305 from the fifth floor 304-5 down to the first floor 304-1 where it is coupled to WLAN access point 112-2. WLAN access point 112-2 relays media received via cable 305 wirelessly to media player 114. Thus media player 114, which is leased for residential use on floor 304-5, is now being used for commercial purposes on floor 304-1 thereby circumventing the cost of a commercial lease. Methods and systems are provided herein to detect usage of devices, such as media player 114, in unauthorized locations by detecting a change in their location over a period of time.

Figure 4:
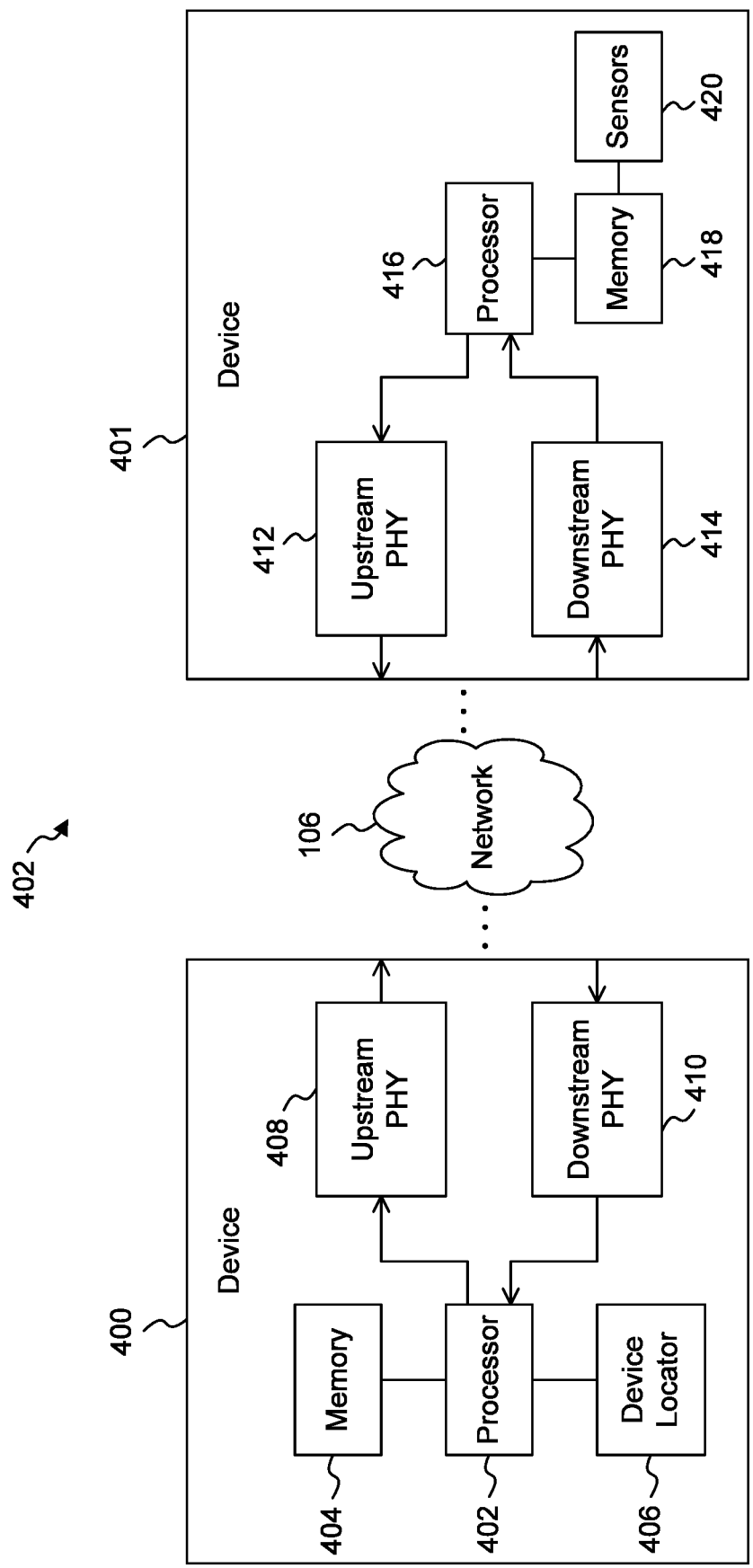
FIG. 4 illustrates an example system to determine a change in a location of a device relative to an initial location of the device according to an embodiment of the disclosure.

FIG. 4 illustrates an example system 402 to determine a change in a location of a device relative to an initial location of the device according to an embodiment of the disclosure. System 402 includes a device 400 coupled to a device 401 via network 106. Device 400 may be a standalone device, or part of, media server 104, headend 102, cloud servers 108, or local communications termination point 110. In an example, device 400 transmits media that may be stored in memory 404 to device 401. Device 401 may be, for example, media player 114.

Device 400 includes a processor 402 coupled to a memory 404 and a device locator 406. Processor 402 is also coupled to upstream physical layer (PHY) 408 and downstream PHY 410. Device 401 includes a processor 416 coupled to a memory 418 and to sensor 420. Processor 416 is also coupled to an upstream PHY 412 and a downstream PHY 414. Processor 402 and processor 406 may include processor circuitry as described herein, According to an embodiment of the disclosure, data is received by device 401 via downstream PHY 414. The data may be media including, but not limited to, video, audio or image data. Sensor 420 is configured to measure one or more parameters associated with device 401. Sensor 420 is further illustrated in FIG. 5.

Figure 5:
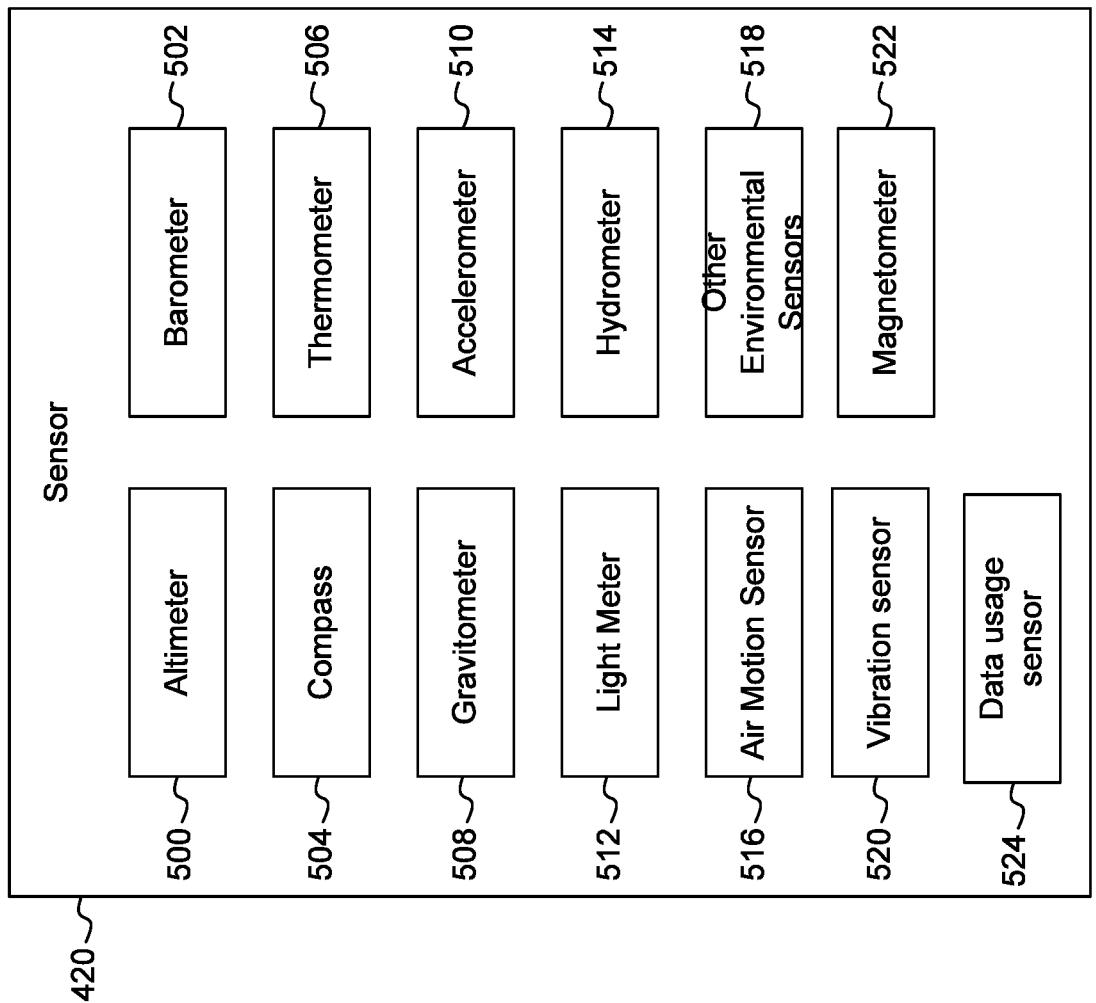
FIG. 5 illustrates physical parameter sensors according to an embodiment of the disclosure.

Referring to FIG. 5, sensor 420 maybe a stand-alone chip or multiple chips. Sensor 420 may include one or more of an altimeter 500, a barometer 502, a compass 504, a thermometer 506, a gravitometer 508, an accelerometer 510, a light meter 512, a hydrometer 514, an air motion sensor 516, other environmental parameter sensor 518, a vibration sensor 520, a magnetometer 522, and a usage sensor 524.

Altimeter 500 measures an altitude. Barometer 502 measures a proximate atmospheric pressure. Compass 504 measures a geological orientation in any axis. Thermometer 506 measures an ambient temperature. Gravitometer 508 measures a proximate gravitational field. Accelerometer 510 measures physical acceleration. Light meter 512 measures ambient light. Hydrometer 514 measures a moisture level. Air motion sensor 516 measures proximate motion of air. Magnetometer 522 measures a proximate magnetic field. Vibration sensor 520 measures vibration. Other environmental parameter sensor 518 measures any environmental parameters not associated with operation of device 401 that are not measured by the other sensors in sensor 420. Usage sensor 524 measures how a device that sensor 420 is installed in, for example device 401, is used. For example, usage sensor 524 may measure channel tuning speed, time of usage, or content selected using device 401. According to an embodiment of the disclosure, sensor 420 periodically transmits parameters measured using sensors 500-524, using upstream PHY 412 to device 400. In another example, sensor 420 intermittently transmits parameters measured using sensors 500-524, using upstream PHY 412 to device 400. In a further example, sensor 420 continuously transmits parameters measured using sensors 500-524, using upstream PHY 412 to device 400. In yet another example, sensor 420 buffers parameters measured using sensors 500-524 and transmits the buffered parameters in a burst to device 400.

Referring to FIG. 4, the operation of device 400 will be described with respect to the flowcharts 600-800 in FIGS. 6-8. Flowcharts 600-800 will be described with continued reference to the example operating environment depicted in FIGS. 1-5. However, the flowcharts are not limited to the embodiments in FIGS. 1-5. Note that the steps shown in flowcharts 600-800 do not necessarily have to occur in the order shown. In an example, the steps in flowcharts 600-800 are performed by processor 402 based on instructions stored in memory 404. In another example, the steps in flowcharts 600-800 are performed by device locator 406 using hardware logic circuitry.

Figure 6:
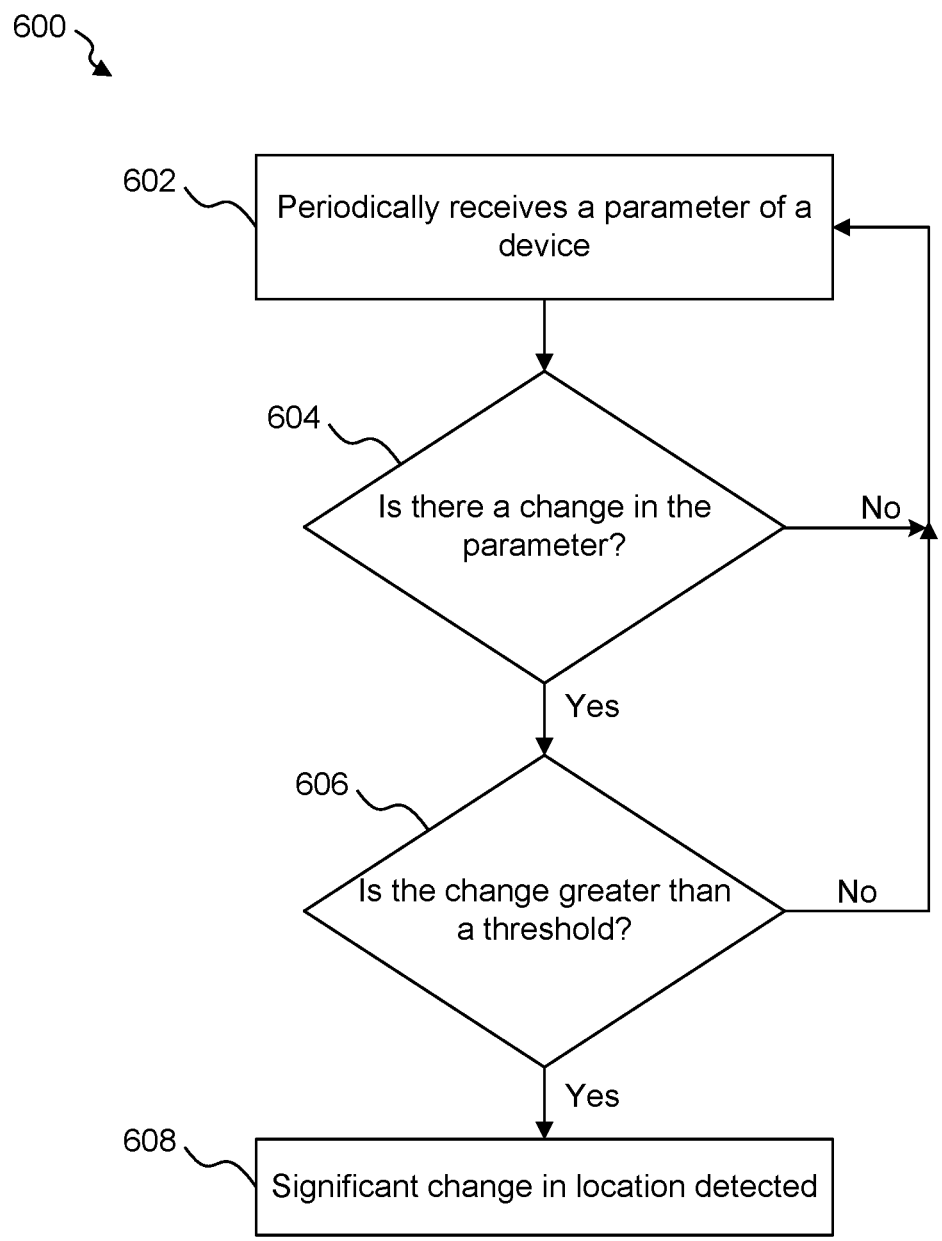
FIG. 6 illustrates a flowchart showing steps to determine a significant change in location of a device relative to an initial location of the device based on changes in a parameter over time.

FIG. 6 illustrates a flowchart 600 showing steps to determine a significant change in location of a device based on changes in a parameter over time.

In step 602, device 400 periodically receives a parameter from device 401. For example, device 400 receives a parameter, such as the altitude of the device measured by altimeter 500.

In step 604, device 400 determines a change in the parameter over a period of time. For example, if the altitude of device 401 is 100 feet at an initial time t1 and 10 feet at a time t2, then there is a change in the altitude of the device 401 from time t1 to time t2. If there is a change in the parameter then the process proceeds to step 606. If there is no change in the parameter then the process proceeds to step 602.

In step 606, device 400 determines whether the change in the parameter is greater than a threshold. If the change in the parameter is greater than the threshold then the process proceeds to step 608. If the change in the parameter is less than the threshold then the process proceeds to step 602. In an example, the threshold for altitude change is 15 feet. If the altitude at time t1 is 100 feet and the altitude at time t2 is 95 feet, then change in altitude is less than the threshold and the process proceeds to step 602. If the altitude at time t1 is 100 feet and the altitude at time t2 is 10 feet, then the change in altitude is above the threshold and the process proceeds to step 608. Using the threshold excludes minor changes in the location of a device 401, for example, parameter changes due to a user moving a device within a room can be excluded by using the threshold.

In step 608, it is determined that the change in location is significant based on the change in the parameter being over the threshold.

Figure 7:
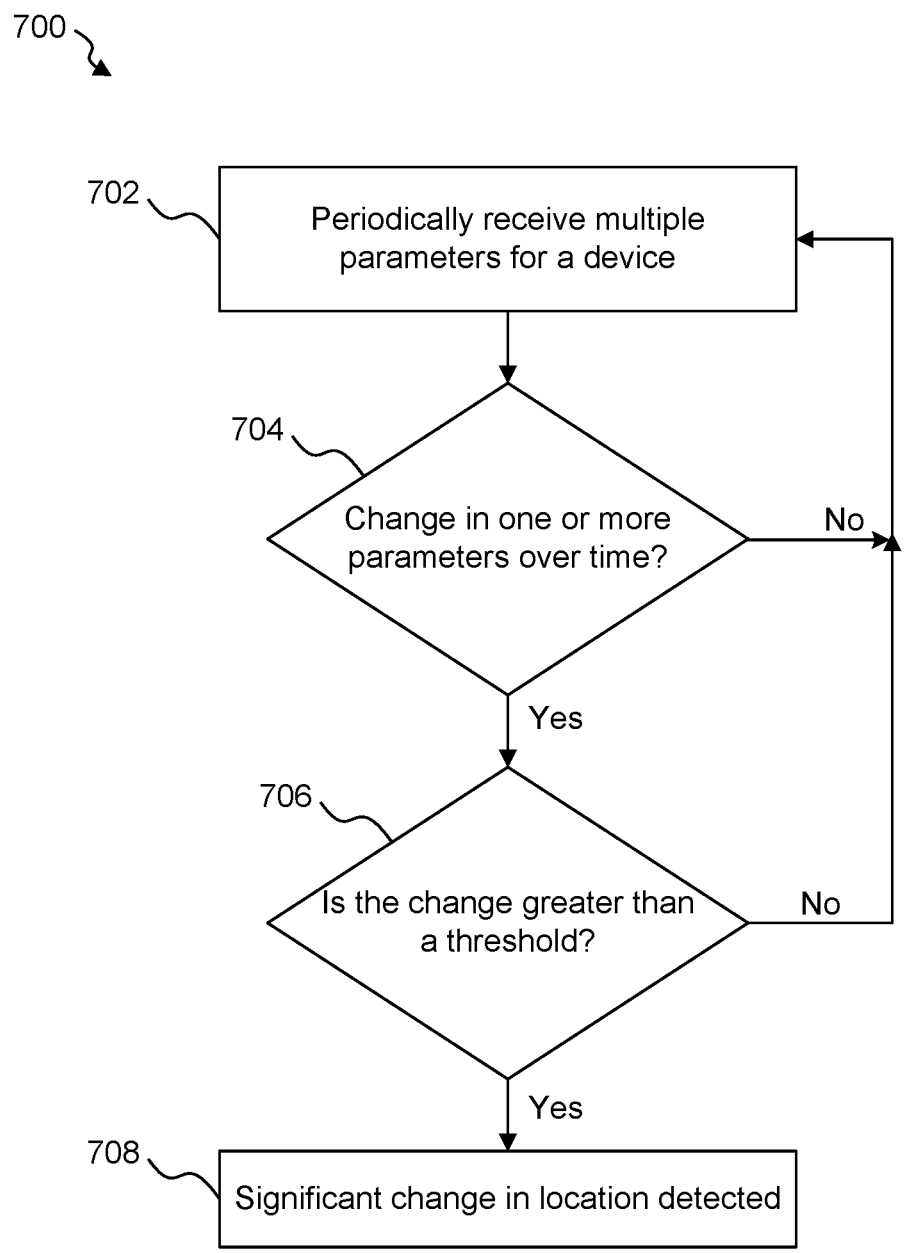
FIG. 7 illustrates a flowchart showing steps to determine a significant change in location of a device relative to an initial location of the device based on changes in multiple parameters over time.

FIG. 7 illustrates a flowchart 700 showing steps to determine a significant change in location of a device based on changes in multiple parameters over time.

In step 702, device 400 periodically receives multiple parameters from device 401. For example, device 400 may receive parameters such as altitude and geological orientation from sensor 420.

In step 704, device 400 determines whether there is a change over a period of time in one or more of the parameters received in step 702. If there are no changes in the one or more parameters over a period of time then the process proceeds to step 702. If there are changes in the one or more parameters over a period of time then the process proceeds to step 706.

In step 706, device 400 determines whether the change in the one or more parameters is greater than a respective threshold. For example, it is determined whether the change in altitude or geological orientation is greater than their respective thresholds. If the change is greater than the respective thresholds then the process proceeds to step 708. If the change is less than a predetermined threshold then the process proceeds to step 702.

In step 708, it is determined that the change in location is significant based on change(s) in the one or more parameters being over the threshold.

Figure 8:
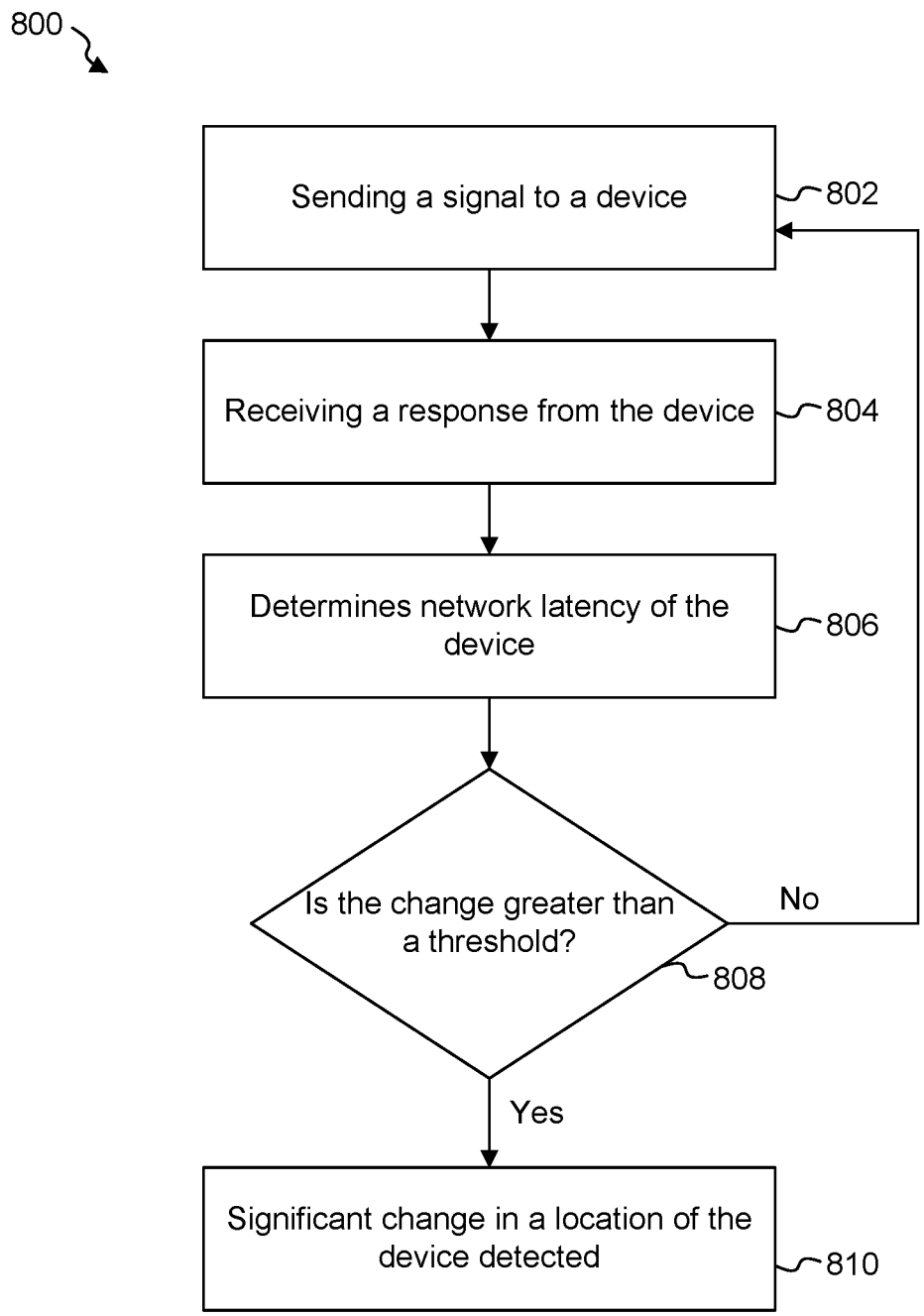
FIG. 8 illustrates an example flowchart illustrating steps to determine whether there is a significant change in location relative to an initial location of the device based on a change in network latency of the device over time.

FIG. 8 illustrates an example flowchart 800 illustrating steps to determine whether there is a significant change in location of a device over time based on a change in network latency.

In step 802, a signal is periodically transmitted to a device. For example, device 400 periodically transmits a ping or a packet to device 401.

In step 804, a response is received. For example, a reply message or response signal is received from device 401 in response to the signal transmitted by device 400 in step 802.

In step 806, a network latency of is determined based upon the response received in step 804. For example, the network latency is determined based on a time at which the signal is sent to device 401 in step 802 and a time at which the response is received in step 804.

In step 808, it is determined whether the change in latency is greater than a threshold. For example, there may be minor changes in the network latency due to network congestion. By comparing the change in network latency to a threshold, minor changes in network latency are excluded. For example, if a device is moved within a house or within a room, there will not be a significant change in network latency. However if the device is moved to a location such that the change in network latency is above the threshold, then it indicates a significant change in location of the device. If the change in network latency is less than the threshold, then the process proceeds to step 802. If the change in network latency is greater than the threshold, then the process proceeds to step 810.

In step 810, it is determined that there is a significant change in location of the device based on the change in the network latency being above the threshold.

It is to be appreciated by persons of skill in the art that network latency may be used as the parameter in flowchart 600 or one of the multiple parameters in flowchart 700 to determine a change in location of the device 401.

Figure 9:
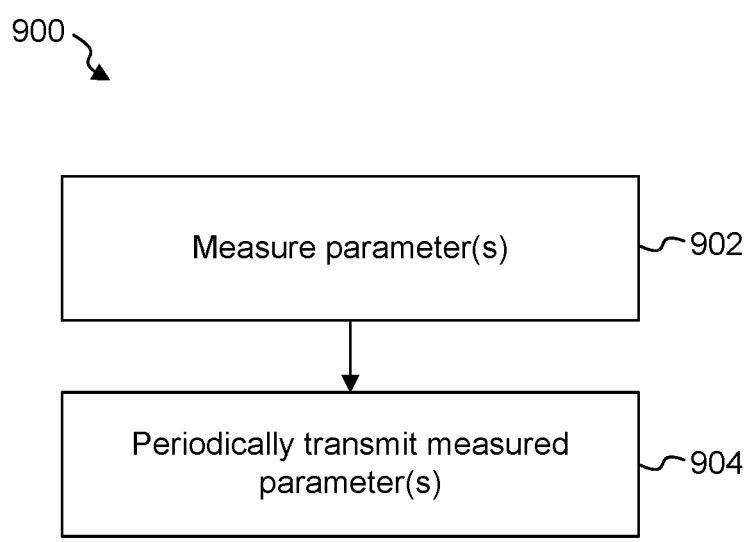
FIG. 9 illustrates an example flowchart illustrating steps performed to determine physical parameters associated with a device.

FIG. 9 illustrates an example flowchart 900 illustrating steps performed to determine physical parameters associated with device 401.

In step 902, periodically measure one or more parameters. For example, device 401 periodically measures one or more parameters using one or more of sensors 500-524.

In step 902, the periodically measured parameter(s) are transmitted. For example, the periodically measured parameter(s) are transmitted to device 400 to determine whether a change in the one or more parameters over time indicates a change in a location of the device 401.

In the embodiments presented herein, after a significant change in location has been detected, a service provider providing media may take remedial measures. For example, device 400 may transmit a message to device 401 indicating that device 401 is being used in an unauthorized location or make an audible sound. The message may be displayed by device 401 or by a display such as display device 116. Device 401 may activate a flashing light or transmit a WiFi or Near Field Communication (NFC) that can be received by the device 400 or by a device used by a service technician. In a further example, the WiFi or NFC signal is received by the device 400 and stored in a database that is either internal or external to the device 400. In another example, device 401 might activate a light that is internal to device 401 and can be seen only when the device 401 is opened. In a further example, device 400 may generate a cryptographic entry that indicates movement of the device. Part of the solution is that an end-user of device 401 is not be able to detect that device 401 includes tracking mechanisms. In another example, the service provider may stop transmission of media to device 401 upon detecting a significant change in location of device 401. In a further example, a service provider might adjust a rate charged to the user of device 401 upon detection of a significant change in location of device 401. In a further embodiment, device 400 may include a database in memory 404 that associates locations with rates charged for displaying media at the locations. When device 400 detects a change in location from a first location associated with a first rate to a second location associated with a second rate, device 400 may transmit a message to device 401 indicating unauthorized use of device 401 in the second location. Device 400 may also terminate transmission of media or charge an additional fees for displaying media in the second location as described above.

Figure 10:
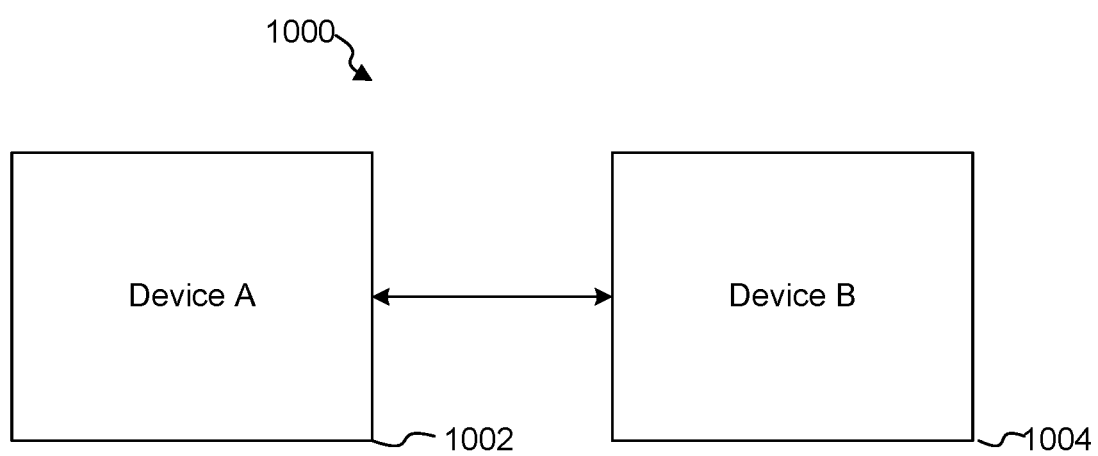
FIG. 10 illustrates an example system.

FIG. 10 shows an example system 1000 according to an embodiment of the disclosure. System 1000 illustrates device 1002 in communication with device 1004. Device 1002 may be, for example, a control or evaluation system that receives data from device 1004 and sends commands or instructions to device 1004. Device 1004 includes sensor 420. Device 1002 may communicate with device 1004 through any type of wired or wireless network. In an embodiment, device 1002 is device 400 and device 1004 is device 401. In another example, device 1004 can be any type of electronic device, for example a remote surveillance camera unit. The remote surveillance camera could be located in, for example, a residential or commercial facility. The remote surveillance camera could be located in a forest to monitor wildlife or in the ocean to monitor ocean life. In another example, device 1004 could be a mobile communications device such as a cellphone, a tablet, a laptop or any other portable electronic device. According to an embodiment of the disclosure, device 1004 collects parameters measured by sensors 420 either periodically or intermittently. Device 1004 might either transmit the collected parameters contemporaneous with measurement or transmit the collected parameters in periodic or intermittent bursts to device 1002.

Device 1002 may conduct a time-trend analysis or curve-trend analysis on the parameters received from device 1004. For example, device 1004 may measure temperature changes via thermometer 506 in sensor 420. The temperature measured by device 1004 will exhibit changes based on time of day as well as seasonal variations in temperature. These changes can be used to generate a trend in the ambient temperature experienced by the device 1004. If the device is moved to a new location, the trend in ambient temperature may change significantly. By comparing the trends in temperature over a period of time, device 1002 may be able to determine a change in the position of device 1004. In a further embodiment, the time-trend analysis may be conducted by device 1004 itself with no data being sent back to device 1002. In such an example, device 1004 might be able to take remedial measures itself such as locking device 1004 or displaying a message without a prompt or command from device 1002. In an example, if device 1004 is a surveillance camera that is moved by the wind or wildlife, it may be able to reposition itself using built-in motors (not shown.)

The embodiments presented herein apply to any communication system between two or more devices or within subcomponents of any one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 11:
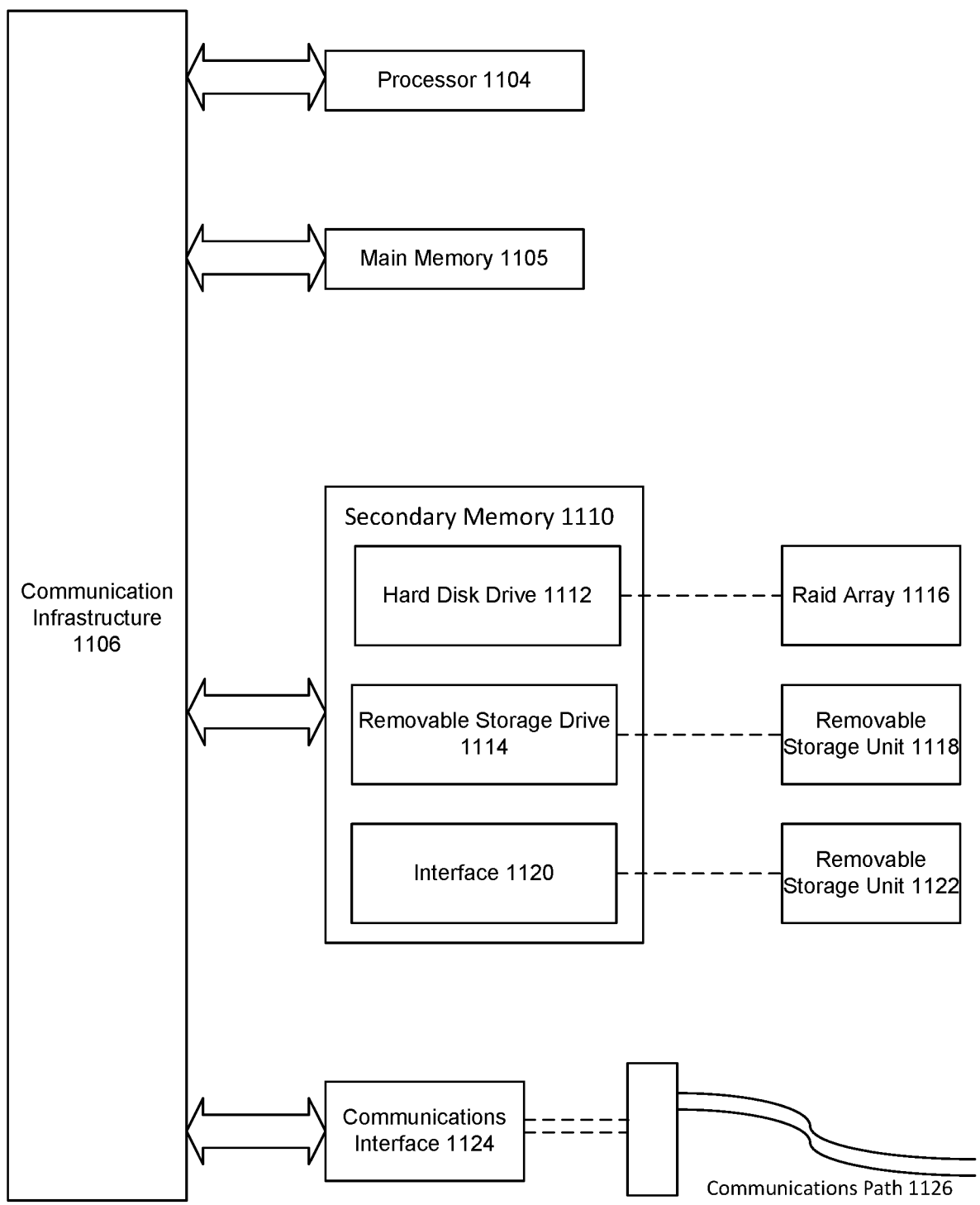
FIG. 11 illustrates an example computer system.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 1100 is shown in FIG. 11. Computer system 1100 may be used to implement part of whole of device 400 or device 401. The computer system 1100 includes one or more processors, such as processor 1104. Processor 1104 can be a special purpose or a general-purpose digital signal processor. The processor 1104 is connected to a communication infrastructure 1106 (for example, a bus or network). Various software implementations are described in terms of this exemplary computer system. After reading this description, it will become apparent to a person skilled in the relevant art how to implement the disclosure using other computer systems and/or computer architectures.

Computer system 1100 also includes a main memory 1105, preferably random access memory (RAM), and may also include a secondary memory 1110. The secondary memory 1110 may include, for example, a hard disk drive 1112, and/or a RAID array 1116, and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118 represents a floppy disk, magnetic tape, optical disk, etc. As will be appreciated, the removable storage unit 1118 includes a computer usable storage medium having stored therein computer software and/or data. Processor 1104 may implement the embodiments described herein based on instructions stored in one or more of main memory 1105 or secondary memory 1110.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software (i.e. instructions) and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc, that are coupled to a communications path 1126. The communications path 1126 can be implemented using wire or cable, fiber optics, a phone line, a cellular phone link, an RF link and other communications links or channels.

The terms "computer program medium" and "computer usable medium" are used herein to generally refer to media such as removable storage drive 1114, a hard disk installed in hard disk drive 1112, or other hardware type memory. These computer program products are means for providing or storing software (e.g. instructions) to computer system 1100.

Computer programs (also called computer control logic) are stored in main memory 1105 and/or secondary memory 1110. Computer programs may also be received via communications interface 1124. Such computer programs, when executed, enable the computer system 1100 to implement the present disclosure as discussed herein. In particular, the computer programs, when executed, enable the processor 1104 to implement the processes and/or functions of the present disclosure. For example, when executed, the computer programs enable processor 1104 to implement part of or all of the steps described above with reference to the flowcharts herein. Where the disclosure is implemented using software, the software may be stored in a computer program product and loaded into computer system 1100 using raid array 1116, removable storage drive 1114, hard drive 1112 or communications interface 1124.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method for determining a location of a device, the method comprising:
   receiving a physical parameter of the device;
   generating a first trend for the physical parameter over a first period of time;
   generating a second trend for the physical parameter over a second period of time; and
   determining a change in the location of the device based on a change between the first trend and the second trend.

2. The method of claim 1, wherein the physical parameter comprises at least one of:
   an altitude of the device, an atmospheric pressure proximate to the device, a geological orientation of the device, a magnetic orientation of the device, an ambient temperature of the device, a gravitational field proximate to the device, an acceleration experienced by the device, an ambient light, a moisture level proximate to the device, a motion of air proximate to the device, and a vibration experienced by the device.

3. The method of claim 1, further comprising:
   receiving a second physical parameter of the device;
   generating a third trend for the second physical parameter over the first period of time;
   generating a fourth trend for the second physical parameter over the second period of time; and
   determining the change in the location of the device based on the change between the first trend and the second trend and a second change between the third trend and the fourth trend.

4. The method of claim 3, wherein the second physical parameter comprises a network latency or a usage data of the device.

5. The method of claim 4, wherein the usage data comprises a channel tuning speed, a time of usage, or a content selection.

6. The method of claim 1, wherein the determining comprises:
   determining a network latency of the device based on a time between sending a first signal to the device and receiving a second signal from the device; and
   determining the change in the location of the device based on the change between the first trend and the second trend and a change in the network latency of the device.

7. A system for determining a location of a device, the system comprising:
   a downstream physical layer (PHY) configured receive a physical parameter of the device; and
   a control unit configured to:
      generate a first trend for the physical parameter over a first period of time,
      generate a second trend for the physical parameter over a second period of time, and
      determine a change in the location of the device based on a change between the first trend and the second trend.

8. The system of claim 7, wherein the physical parameter comprises at least one of:
   an altitude of the device, an atmospheric pressure proximate to the device, a geological orientation of the device, a magnetic orientation of the device, an ambient temperature of the device, a gravitational field proximate to the device, an acceleration experienced by the device, an ambient light, a moisture level proximate to the device, a motion of air proximate to the device, and a vibration experienced by the device.

9. The system of claim 7, wherein the downstream PHY is further configured to receive a second physical parameter of the device; and
   wherein the control unit is further configured to:
      generate a third trend for the second physical parameter over the first period of time,
      generate a fourth trend for the second physical parameter over the second period of time, and
      determine the change in the location of the device based on the change between the first trend and the second trend and a second change between the third trend and the fourth trend.

10. The system of claim 9, wherein the second physical parameter comprises a network latency or a usage data of the device.

11. The system of claim 10, wherein the usage data comprises a channel tuning speed, a time of usage, or a content selection.

12. The system of claim 7, wherein the control unit is further configured to:
   determine a network latency of the device based on a time between sending a first signal to the device and receiving a second signal from the device, and
   determine the change in the location of the device based on the change between the first trend and the second trend and a change in the network latency of the device.

13. The system of claim 7, wherein the device comprises a media player or a cable modem.

14. A system for determining a location of a device, the system comprising:
   a memory configured to store instructions;
   a processor configured to execute the instructions, the instructions, when executed by the processor, configuring the processor to:
      receive a physical parameter of the device,
      generate a first trend for the physical parameter over a first period of time,
      generate a second trend for the physical parameter over a second period of time, and
      determine a change in the location of the device based on a change between the first trend and the second trend.

15. The system of claim 14, wherein the physical parameter comprises at least one of:
   an altitude of the device, an atmospheric pressure proximate to the device, a geological orientation of the device, a magnetic orientation of the device, an ambient temperature of the device, a gravitational field proximate to the device, an acceleration experienced by the device, an ambient light, a moisture level proximate to the device, a motion of air proximate to the device, and a vibration experienced by the device.

16. The system of claim 14, wherein the instructions, when executed by the processor, further configure the processor to:
   receive a second physical parameter of the device,
   generate a third trend for the second physical parameter over the first period of time,
   generate a fourth trend for the second physical parameter over the second period of time, and
   determine the change in the location of the device based on the change between the first trend and the second trend and a second change between the third trend and the fourth trend.

17. The system of claim 14, wherein the second physical parameter comprises a network latency or a usage data of the device.

18. The system of claim 14, further comprising:
   a sensor configured to measure the physical parameter.

19. The system of claim 17, wherein the sensor comprises at least one of:
   an altimeter, a barometer, a compass, a gravitometer, an accelerometer, a thermometer, a light meter, a hydrometer, a data usage sensor, a magnetometer, a vibration sensor, and a light meter.

20. The system of claim 14, wherein the instructions, when executed by the processor, further configure the processor to:
   determine a network latency of the device based on a time between sending a first signal to the device and receiving a second signal from the device, and
   determine the change in the location of the device based on the change between the first trend and the second trend and a change in the network latency of the device.

* * * * *